United States Patent [19]
Swan

[11] Patent Number: 6,021,953
[45] Date of Patent: *Feb. 8, 2000

[54] YEAR-ROUND AIR CONDITIONING APPARATUS AND METHOD

[76] Inventor: Ross M. Swan, R.R. #4, Stirling, Canada, K0K 3E0

[*] Notice: Under 35 U.S.C. 154(b), the term of this patent shall be extended for 248 days.

[21] Appl. No.: 08/517,946

[22] Filed: Aug. 22, 1995

[51] Int. Cl.[7] .................................................. G05D 22/00
[52] U.S. Cl. ........................................ 236/44 A; 454/253
[58] Field of Search ............................ 236/44 A; 454/253

[56] References Cited

U.S. PATENT DOCUMENTS

| | | | |
|---|---|---|---|
| 2,212,050 | 8/1940 | Samuelson | 98/33 |
| 2,281,002 | 4/1942 | Eck | 98/33 |
| 2,433,544 | 12/1947 | Blake | 98/43 |
| 2,615,383 | 10/1952 | Jenn | 98/33 |
| 2,750,868 | 6/1956 | Mieczkowski | 98/116 |
| 2,828,682 | 4/1958 | Marker | 98/43 |
| 2,831,638 | 4/1958 | Fulk | 236/49 |
| 3,173,353 | 3/1965 | Watkins | 98/29 |
| 3,332,620 | 7/1967 | Streed | 236/44 |
| 3,459,115 | 8/1969 | Guthermuth | 98/43 |
| 4,251,026 | 2/1981 | Siegel | 236/49 |
| 4,292,927 | 10/1981 | Sassmann | 454/253 |
| 4,515,070 | 5/1985 | Bobjer et al. . | |
| 4,843,786 | 7/1989 | Walkinshaw | 52/169 |
| 4,885,984 | 12/1989 | Franceus | 98/42.02 |
| 4,905,579 | 3/1990 | Dame | 98/1.5 |
| 4,953,450 | 9/1990 | Remandino | 98/33.1 |
| 4,957,394 | 9/1990 | Jarnagin | 405/128 |
| 5,092,520 | 3/1992 | Lestage | 236/44 |

FOREIGN PATENT DOCUMENTS

| | | | |
|---|---|---|---|
| 429361 | 8/1945 | Canada . | |
| 1097531 | 3/1981 | Canada . | |
| 1099138 | 4/1981 | Canada . | |
| 1186999 | 2/1965 | Germany | 98/42.04 |
| 0207933 | 8/1988 | Japan | 98/42.04 |

*Primary Examiner*—William E. Tapolcai
*Attorney, Agent, or Firm*—Hodgson, Russ, Andrews, Woods & Goodyear, LLP

[57] ABSTRACT

An apparatus which may be used year-round for dehumidifying air in the enclosed space of a building to comfortably allow a higher temperature during summer conditions and for exchanging air in the enclosed space year-round with fresh air to provide a more healthful environment within the building. The apparatus includes a fan mounted on or otherwise adjacent the basement floor or other bottom floor and a conduit connecting the fan outlet to an opening in an outside wall for removing stale relatively damp air from the bottom floor level and discharging it out of the building. Vents as needed are provided in upper floors for circulating relatively dry air downwardly toward the bottom floor. The air extracted is replaced by fresh air through cracks or the like in the building or by an opening provided in an outside wall at an upper level of the building.

14 Claims, 2 Drawing Sheets

YEAR-ROUND AIR CONDITIONING APPARATUS AND METHOD

The present invention relates generally to the conditioning of air within a building. More particularly, the present invention relates to the extraction of air from a building for the purpose of dehumidifying the air or otherwise conditioning it.

U.S. Pat. No. 4,515,070 to Bobjer et al discloses a temporary room ventilation apparatus for ventilation of harmful solvents out from a room where paint work is temporarily being undertaken. The apparatus comprises a flexible hose having one end which is connected to a balloon in a window of the room and the other end connected to the upper part of a fan housing. The inflation of the balloon causes it to abut the window space. The ventilating air is led out through holes in the outer wall of the balloon. The fan housing is mounted in a fan stand which stands on the floor. Air in the room is thus blown out by the fan through the hose and balloon.

Other art illustrating apparatus for extracting or otherwise conditioning air includes U.S. Pat. Nos. 2,212,050; 2,281,002; 2,750,868; 4,885,984; 4,905,579; 4,953,450; 4,957,394; and 5,092,520, and Canadian patent 1,172,089, and the patents cited by U.S. Pat. No. 5,092,520.

It is considered desirable for health reasons to exchange the air in enclosed spaces of various buildings such as warehouses, hair salons, chicken houses, and factories so as to eliminate dust and various noxious substances which may evolve into the enclosed spaces. Newer homes typically are sealed so that noxious gases may not naturally be evolved to the outside. It is thus considered desirable to be able to exchange the air in newer homes as well as in other buildings year-round, i.e., while being heated in winter as well as while being cooled in summer.

The degree of comfort in a building being cooled is related to the degree of humidity. Typically, a thermostat may be set at 72° F. during the summer for cooling. If the relative humidity in a building could be reduced from perhaps about 75% to perhaps about 45%, the thermostat setting may be raised to cool to perhaps only about 75° F. while maintaining the same comfort level. This would save substantial energy cost and thus substantially reduce the electric bill for the homeowner or building user.

U.S. Pat. No. 5,092,520 to Lestage, which is incorporated herein by reference, discloses air extraction apparatus for dehumidifying air in a basement or other enclosed areas. The apparatus includes a conduit installed with its outlet end in communication with an opening in a wall of the enclosure and with its inlet end in proximity to the floor. A fan is located in the conduit to effect movement of air from the floor level through the inlet end and outwardly of the outlet end. A humidistat (humidity control switch) is connected to regulate fan operation so that the desired humidity level is maintained.

The Lestage apparatus also includes a frost control switch to prevent the operation of the fan when the temperature in the enclosed area is below 40° F. or other preset temperature. It is stated that below this temperature, "any operation of the fan would only serve to reduce the temperature in the crawl space, thus possibly freezing any plumbing system in this space". Furthermore, a cold outside temperature may cause the fan in the outlet end of the conduit to ice-up, becoming inoperable. Thus, the Lestage apparatus may not be operable on cold days.

During heating of a building, it is considered desirable to humidify the enclosed space to achieve the desired comfort. However, it is still considered desirable to exchange the air in the enclosed space being heated to remove dust, noxious substances and the like, especially in newer homes, factories, and the like. The Lestage apparatus cannot serve to exchange the air in enclosed spaces year-round in colder climates.

It is accordingly an object of the present invention to provide exchange of air in the enclosed space of a building year-round while providing dehumidification while the enclosed space is being cooled.

In order to provide for air exchange in an enclosed space of a building year-round as well as dehumidification while the space is being cooled, in accordance with the present invention, a fan is mounted on or otherwise provided adjacent the bottom floor such as a basement floor of the building to remove air from the bottom floor level. The air is discharged through a conduit the outlet of which is connected to an opening in an outside wall. Vents may be provided in upper floors for routing relatively drier upper air toward the bottom floor to replace relatively damper air being removed. A fresh air intake valve may be provided in an opening in an outside wall, preferably near the top of the enclosed space, to replace the relatively humid air being discharged.

The above and other objects, features, and advantages of the present invention may be found in the following detailed description of the preferred embodiment thereof when read in conjunction with the appended drawings wherein the same reference numerals denote the same or similar parts throughout the views.

DETAILED DESCRIPTION OF THE PREFERRED EMBODIMENT

Figure 1:
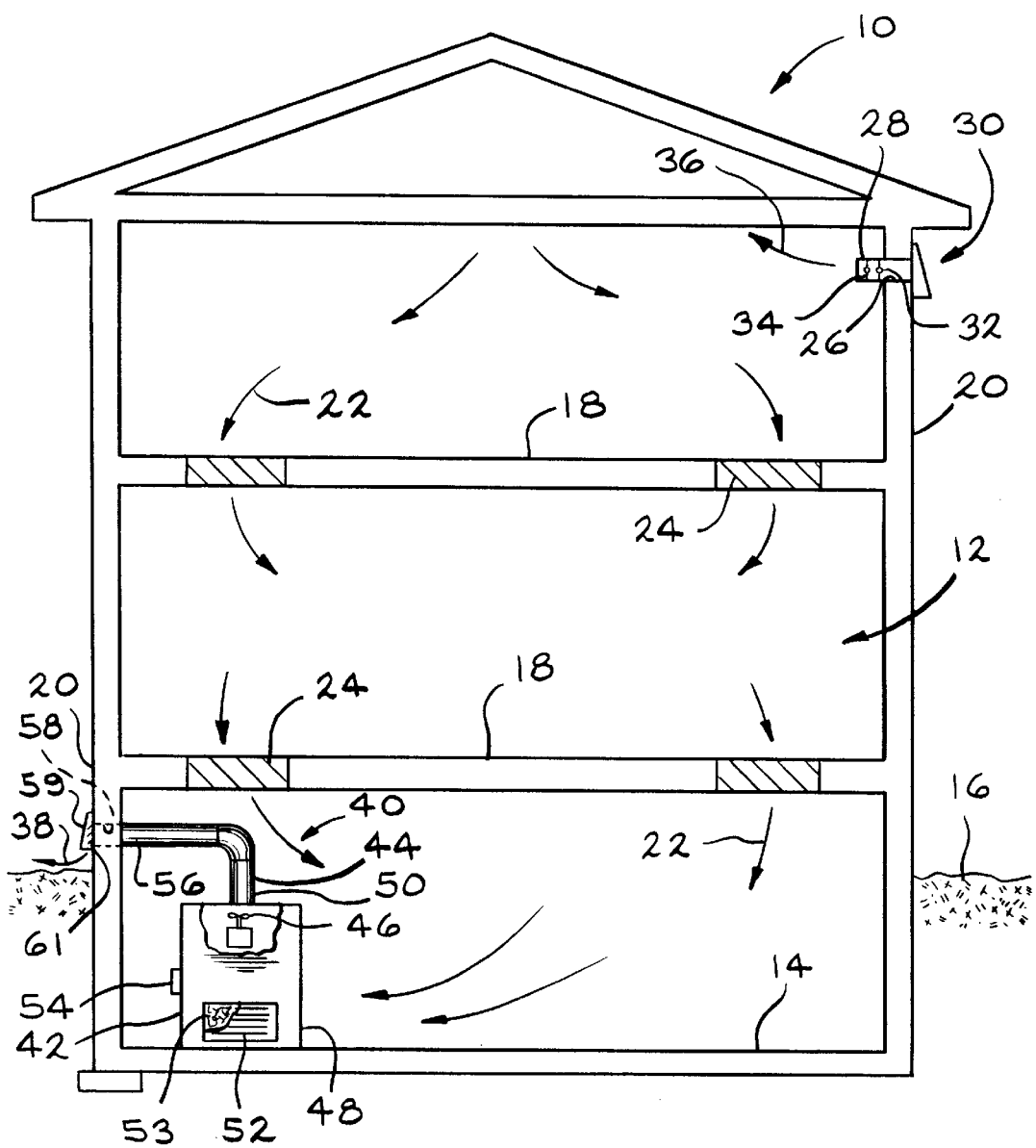
FIG. 1 is schematic view of a building and apparatus which embodies the present invention.

Referring to FIG. 1, there is illustrated generally at 10 a building having an enclosed space, illustrated at 12. The building has a bottom floor 14 which is a basement floor and which is located below the level of the ground 16. Upper floors are illustrated at 18, and outside walls are illustrated at 20. As used herein, the term "building" is meant to refer to any structure having enclosed space and which includes, but is not limited to, houses, factories, boats with cabin facilities or the like, warehouses, chicken houses, hair salons, greenhouses, commercial vehicle garages, and nursing homes.

The enclosed space of a building may typically have a humidity gradient with stale damper air being along the basement floor 14 and drier air being near the top of the space. In order to reduce the humidity within the enclosed space on hot days so that the temperature may be kept at a higher level for the desired comfort, the relatively damp stale air at the basement floor level is removed and discharged out of the enclosed space, as illustrated at 38 and as discussed hereinafter.

The drier air in the higher levels of the enclosed space moves downwardly, as illustrated at 22, to replace the discharged damper air. Vents, illustrated at 24, which may be adjustable, may be provided as needed in the upper floors 18 to accommodate the downward flow of air.

Due to the trend of sealing homes and improved replacement windows, there may not be an adequate inflow of replacement air in newer homes to make up for the amount of internal stale humid air which is expelled externally. In order to provide an adequate inflow of replacement air in an air tight building, an opening, illustrated at 26, is desirably provided in an outside wall 20 to receive fresh static air into the enclosed space, as illustrated at 36, to replace that which is discharged. The opening 26, which is desirably placed at an upper level of the building, is preferably provided with a pipe section, illustrated at 28, having a screened hood intake, illustrated at 30, a suitable automatic damper, illustrated at 32, and a suitable manual override damper, illustrated at 34. The sleeve 28 may have a diameter, for example, of perhaps about 4, 6, or 10 inches and a length of perhaps about 12 inches.

Apparatus 40 comprising a suitable fan and conduit, illustrated at 42 and 44 respectively, are provided for receiving the stale humid air and discharging it from the building 10. The conduit 44 may have a diameter of perhaps about 6 inches.

If the fan were mounted in the outlet end of the conduit, it may be so subjected to the cold outside air on a cold day that it may ice-up, becoming inoperable. In order to allow apparatus 40 to be operated for exchanging air in the enclosed space 12 year-round as well as for dehumidifying the air on hot days, in accordance with the present invention, the fan 42, containing the motor-driven fan blade 46 within housing 48, is mounted on the basement floor 14 or otherwise adjacent the basement floor 14 so that it will be away from cold outside air at the opening 58 and instead be in contact with the conduit 44 which is warmed by inside air so that the fan 42 will not ice-up.

The fan housing 48, which may, for example, be composed of galvanized steal or aluminum, is suitably connected to the conduit inlet end 50 for discharge of the stale humid air along the basement floor 14 into the conduit 44. The fan housing 48 has a suitable louvered and filtered air inlet, illustrated at 52, and a suitable humidistat, illustrated at 54, electrically connected to the fan 42 to automatically shut off the fan 42 at a pre-selected relative humidity and to turn on the fan 42 at another pre-selected relative humidity. The fan 42, for propelling air through the conduit 44, may, for a typical residence, perhaps be a Patriot AC tubeaxial fan having a blade size of perhaps 6.75 inches diameter and 2 inches depth and perhaps have a feathered edge for lower noise. For larger installations, the fan may be a Caravel AC tubeaxial fan having a blade size of 10 inches diameter and 3.5 inches depth and also have a feathered edge for lower noise. Such fans are sold by Comair Rotron, a KLI Company, of San Ysidro, Calif. Such a fan 42 and humidistat 54 are well known in the art and therefore will not be described further herein.

The outlet end 56 of the conduit 44 is suitably connected to an opening, illustrated at 58, which may be louvered, for release of the stale humid air from the basement floor level to the outside of the building. The length of conduit 44 will vary with individual installation requirements and may typically be between about 3 and 15 feet.

The discharge opening 58 may be provided with a suitable wind flap enclosure, illustrated at 59, to prevent invasion of weather elements or undesirable insects or rodents into the building. If desired, a separate humidifier (not shown) may be provided for use during winter conditions.

Louvers, illustrated at 61, at the opening 58 are desirably provided to close, in accordance with principles commonly known to those of ordinary skill in the art to which this invention pertains, when the fan is turned off. In order to allow the louvers 61 to properly close, a fiberglass or other suitable filter, illustrated at 53, is provided at the fan inlet to remove saw dust or other particles which may stick to the louvers in cold weather and interfere with their closure.

Figure 2:
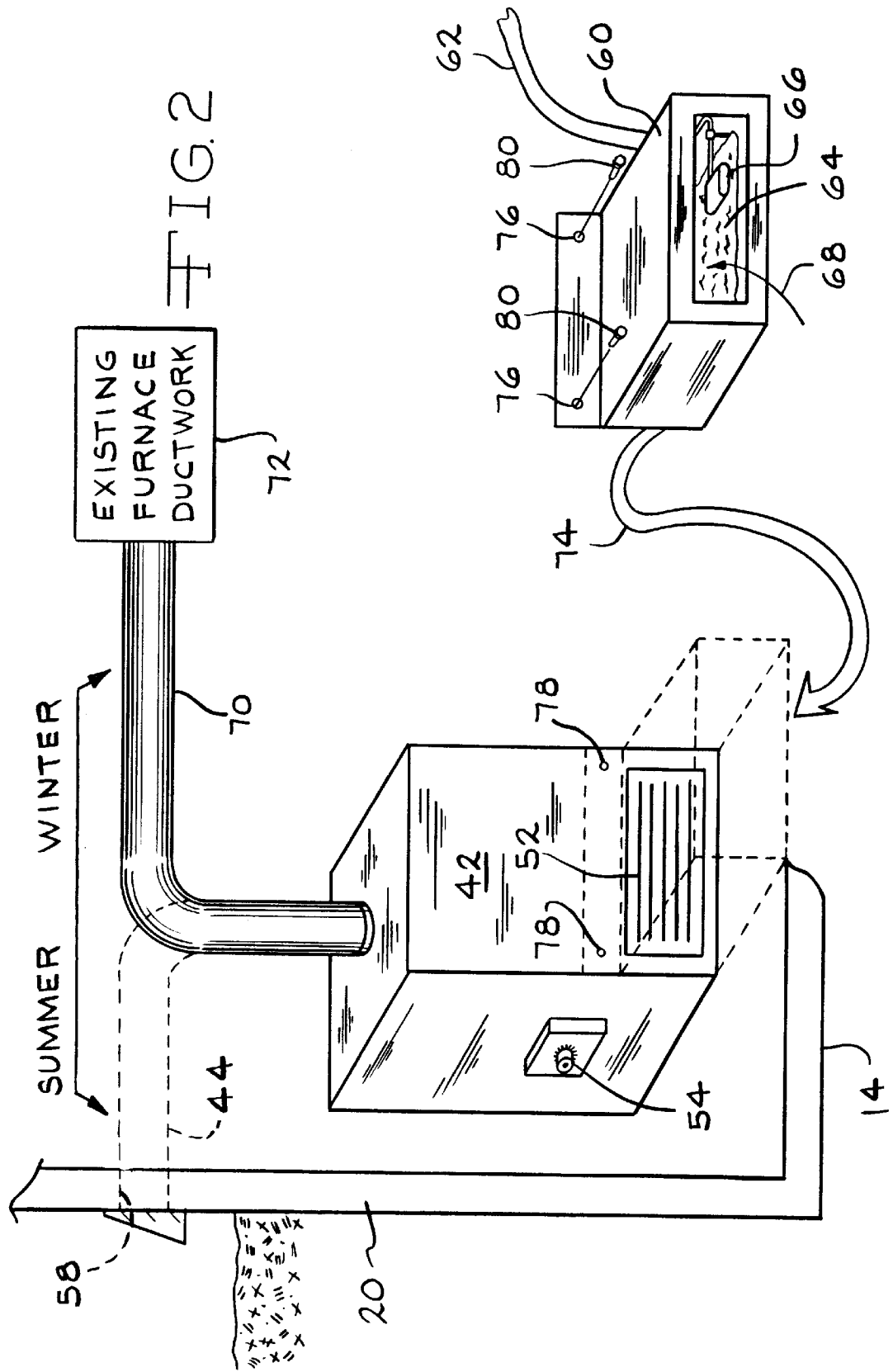
FIG. 2 is a view similar to that of FIG. 1 illustrating an optional adaptation of the apparatus for winter use.

Referring to FIG. 2, if desired, the fan housing 48 may be suitably connected (such as perhaps by 2 screws 80 received in apertures 76 and threadedly inserted in threaded apertures 78) to a suitable humidifier 60, having a water inlet line 62, an air inlet, illustrated at 68, a water tray, illustrated at 64, and float valve 66 for regulating water levels, which are conventionally known in the art. The humidifier 60 is connected to the fan 42 so that the fan 42 may receive humidified air from the humidifier 60 through the fan inlet 52, as illustrated at 74. A conduit 70 is provided to connect the fan outlet to existing furnace ductwork, as illustrated at 72, for delivering humidity received by the air passing through the humidifier to the fan 42, then through the conduit 70 to the existing furnace ductwork for humidifying air in the building 10 during winter conditions. If desired, conduit 44 may be detached from opening 58 and attached to ductwork 72 to serve as conduit 70. During summer conditions, the humidifier 60 would be removed and conduit 44 installed with its outlet 56 connected to opening 58 in an outside wall 20, as illustrated in FIG. 1, for discharging stale humid air to the outside of the building 10.

Referring back to FIG. 1, the fan 42 may be operated during both summer and winter conditions (year-round) to remove stale relatively damp air from the basement floor level and discharge it outside the building, this stale relatively damp air being replaced by fresh outside air so that the air in the enclosed space 12 is cleaner and therefore more healthy. During summer conditions, the decrease in relative humidity and the resulting greater personal comfort will allow the enclosed space 12 to be kept at a higher temperature to thereby allow a net savings of air conditioning costs. During winter conditions, a separate humidifier may be operated to achieve the desired personal comfort while the air removal apparatus 40 may continue to be operated to discharge stale air through opening 58 to maintain cleaner air in the enclosed space 12, resulting in more healthful conditions therein.

The low cost of operation of the air extraction fan 42 (perhaps about $3.00 per month for a residence) allows it to cost effectively be operated year-round, as compared to conventional dehumidifiers which require substantially greater energy costs in condensing moisture in the air but which do not exchange stale air for fresh air.

It should be understood that, while the present invention has been described in detail herein, the invention can be embodied otherwise without departing from the principles thereof, and such other embodiments are meant to come within the scope of the present invention as defined by the appended claims.

What is claimed is:

1. In combination with a building having an enclosed space, a bottom floor, and an outside wall having an opening above ground level, said wall opening having a cross-sectional area, apparatus for year-round conditioning air within the enclosed space, the apparatus comprising conduit means having an air outlet and connected to said wall opening for discharging air through said wall opening to the exterior of the building and further having an air inlet end, said air outlet having a cross-sectional area substantially equal to the cross-sectional area of said wall opening, a fan means adjacent the bottom floor and connected to said air inlet end of said conduit means for removing air from the bottom floor level and discharging the air through said conduit means and the wall opening to the exterior of the building.

2. A combination according to claim 1 wherein the bottom floor is a basement floor.

3. A combination according to claim 1 wherein said fan means is mounted on the bottom floor.

4. Method for conditioning air within the enclosed space of a building comprising the steps of:

a. providing a fan adjacent a bottom floor of the building;
   b. operating the fan thereby removing air from the bottom floor level and discharging the air through a conduit to the exterior of the building and
   c. controlling operation of the fan to regulate humidity in the enclosed space.

5. A method according to claim 4 further comprising providing the fan to be adjacent a basement floor.

6. A method according to claim 4 further comprising providing the fan to be mounted on the bottom floor.

7. In combination with a building having an enclosed space, a bottom floor, and an outside wall having an opening above ground level, apparatus for conditioning air within the enclosed space, the apparatus comprising conduit means having an air outlet and connected to said wall opening for discharging air through said wall opening to the exterior of the building and further having an air inlet end, a fan means adjacent the bottom floor and connected to said air inlet end of said conduit means for removing air from the bottom floor level and discharging the air through said conduit means and the wall opening to the exterior of the building, and means for operating said fan means to regulate humidity in the enclosed space.

8. In combination with a building having an enclosed space, a bottom floor, and an outside wall having an opening above ground level, apparatus for conditioning air within the enclosed space, the apparatus comprising conduit means having an air outlet and connected to said wall opening for discharging air through said wall opening to the exterior of the building and further having an air inlet end, a fan means adjacent the bottom floor and connected to said air inlet end of said conduit means for removing air from the bottom floor level and discharging the air through said conduit means and the wall opening to the exterior of the building, and wherein the building has at least one floor above the bottom floor, the building including vent means in the at least one floor for routing air within the building to said fan means.

9. In combination with a building having an enclosed space, a bottom floor, and an outside wall having an opening above ground level, apparatus for conditioning air within the enclosed space, the apparatus comprising conduit means having an air outlet and connected to said wall opening for discharging air through said wall opening to the exterior of the building and further having an air inlet end, a fan means adjacent the bottom floor and connected to said air end of said conduit means for removing air from the bottom floor level and discharging the air through said conduit means and the wall opening to the exterior of the building, and fresh air intake valve means in an outside wall of the building.

10. A combination according to claim 9 further comprising means for manually closing said fresh air intake valve means.

11. In combination with a building having an enclosed space, a bottom floor, and an outside wall having an opening above ground level, apparatus for conditioning air within the enclosed space, the apparatus comprising conduit means having an air outlet and connected to said wall opening for discharging air through said wall opening to the exterior of the building and further having an air inlet end, a fan means adjacent the bottom floor and connected to said air end of said conduit means for removing air from the bottom floor level and discharging the air through said conduit means and the wall opening to the exterior of the building, and a humidifying means detachably attachable to said apparatus.

12. Method for conditioning air within the enclosed space of a building comprising the steps of:

a. providing a fan adjacent a bottom floor of the building,
   b. operating the fan thereby removing air from the bottom floor level and discharging the air through a conduit to the exterior of the building; and
   c. circulating air through at least one vent in at least one floor above the bottom floor to the fan.

13. Method for conditioning air within the enclosed space of a building comprising the steps of:

a. providing a fan adjacent a bottom floor of the building;
   b. operating the fan thereby removing air from the bottom floor level and discharging the air through a conduit to the exterior of the building; and
   c. intaking fresh air into the building through an intake valve in an outside wall of the building.

14. Method for conditioning air within the enclosed space of a building comprising the steps of:

a. providing a fan adjacent a bottom floor of the building;
   b. operating the fan thereby removing air from the bottom floor level and discharging the air through a conduit to the exterior of the building; and
   c. connecting a humidifier to the fan, connecting a conduit to the fan discharge and to furnace ductwork of the building, and operating the humidifier.

* * * * *